No. 666,825. Patented Jan. 29, 1901.
H. S. STEEL.
COUPLING FOR RAIL OR TRAM WAY VEHICLES.
(Application filed Mar. 12, 1900.)
(No Model.) 2 Sheets—Sheet 1.
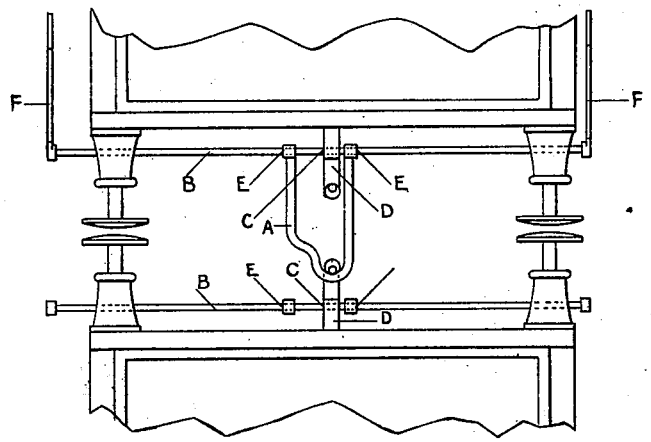
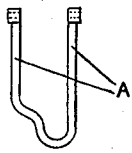
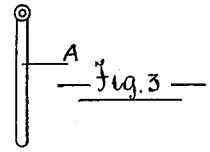
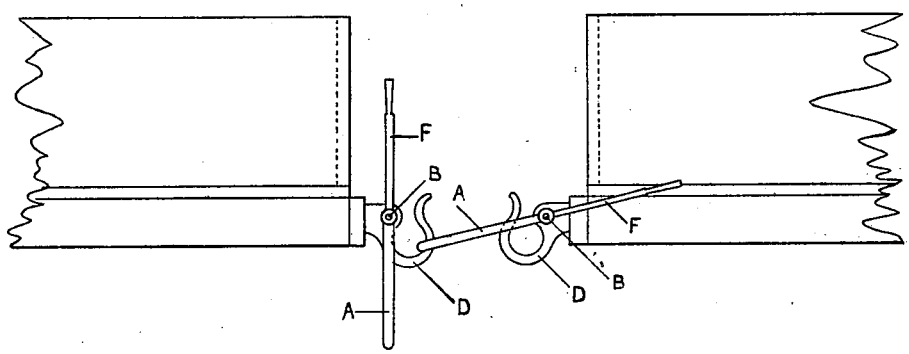
Witnesses:—
William Crossley.
Percy Griffiths.
Inventor
Henry Stephenson Steel
per Hughes & Young
Attorneys.

No. 666,825. Patented Jan. 29, 1901.
H. S. STEEL.
COUPLING FOR RAIL OR TRAM WAY VEHICLES.
(Application filed Mar. 12, 1900.)
(No Model.) 2 Sheets—Sheet 2.
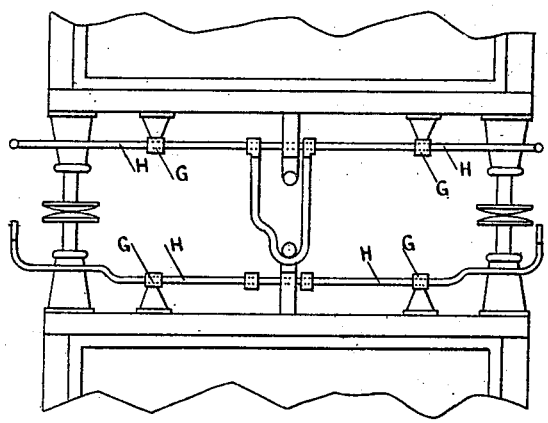
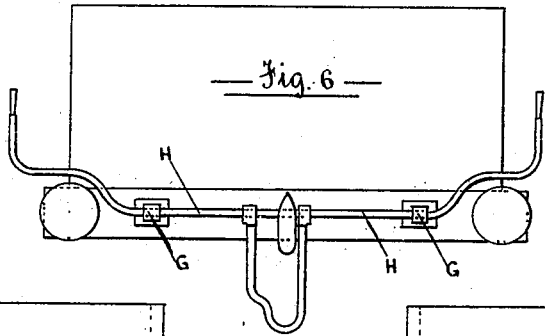
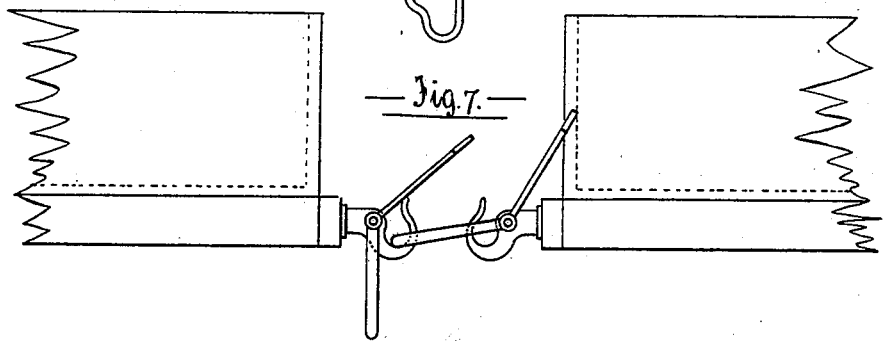
Witnesses:—
William Crossley
Percy Griffith
Inventor
Henry Stephenson Steel
per Hughes & Young
Attorneys.

UNITED STATES PATENT OFFICE.

HENRY STEPHENSON STEEL, OF WALWORTH, ENGLAND.

COUPLING FOR RAIL OR TRAM WAY VEHICLES.

SPECIFICATION forming part of Letters Patent No. 666,825, dated January 29, 1901.

Application filed March 12, 1900. Serial No. 8,400. (No model.)

*To all whom it may concern:*

Be it known that I, HENRY STEPHENSON STEEL, a subject of the Queen of Great Britain and Ireland, residing at 13 Boyson road, Walworth, in the county of Surrey, England, have invented new and useful Improvements in Couplings for Rail or Tram Way Vehicles, of which the following is a specification.

My invention relates to improvements in couplings for railway and tramway vehicles, the object being to provide a coupling which can be put in and out of engagement from either side of the vehicle, and I attain my purpose in the manner illustrated by the accompanying drawings, in which—

Figure 1 is a plan of the coupling in use; Figs. 2 and 3, front and side views, respectively, of part of the coupling; Fig. 4, a side view of the coupling in use; Figs. 5, 6, and 7, a plan, an end view, and a side view, respectively, showing a modification in the shape of certain parts.

At each end of each vehicle I provide an unequally-sided shackle or coupling-link A, rigidly attached in any suitable manner at E to a transverse bar or rod B. The bar B takes the place of and acts as a shackle-pin and has preferably a circular cross-section and is provided at each end with hand-levers or other means F, by which it can be slid to and fro through openings in the buffer-shells or through properly-bushed holes in wooden-headed buffers and also through a hole C in the draw-hook D. The hand-levers also serve for the raising and lowering of the shackle A for the purposes of coupling and uncoupling the vehicles. The coupling is effected by putting the shackle A of one vehicle over the hook D of the adjacent vehicles and the uncoupling by removing the shackle. The object of having the sides of the shackles unequal is that in raising or lowering the shackle the shorter side can by sliding the bar B be brought into position so as to clear the hook D.

When it is desired not to pass the bar B through the buffers, as would be preferable in the case of spring-buffers, it can be cranked or curved so as to pass over or under the buffers, as shown in Figs. 5 and 6, in which case the bar B would be free to run and turn in eye-brackets G, suitably situated so as not to interfere with the "play" necessary to be given to the shackle A. The cranked ends of the bar B are detachably attached to the bar B at the points H. Similar eyes G may also be used, if desired, when the bar B passes through the buffer-shells or sockets.

When the coupling-hooks are furnished with springs, the holes in wooden dead-end buffers must be slotted in the direction of the length of the vehicle, and such must be the case when the bar B passes through the shells and plungers of spring-buffers.

In order to prevent the head and plunger rotating in the sockets and jamming the bar B, a feather and groove must be provided to insure their movement in a longitudinal direction only.

When no buffers are used or when the buffer is central, the bar B must be carried at each end by eye-brackets situated at the positions usually occupied by the buffers when two are used.

When shunting, only one shackle need be used in coupling; but when a train is coupled up for a long journey both shackles may be used.

To facilitate coupling and uncoupling, counterpoise-weights may be used on the bar hand-levers or in connection with any other part.

What I claim as my invention, and desire to secure by Letters Patent, is—

In couplings for railway and tramway vehicles a hook at one end of one of the vehicles: a shackle at the opposing end of the other vehicle: arms on the said shackle of unequal lengths: an S-shaped bridge connecting the outer ends of the said arms: means for moving the shackle horizontally and vertically, and placing it over the said hook, substantially as described and illustrated.

In testimony whereof I have signed my name to this specification in the presence of two subscribing witnesses.

HENRY STEPHENSON STEEL.

Witnesses:
HENRY GEORGE BISHOP,
JOSHUA DAWSON WATTS.